(12) United States Patent
Strid et al.

(10) Patent No.: US 6,258,282 B1
(45) Date of Patent: Jul. 10, 2001

(54) ROTATABLE FILTER SYSTEM FOR FILTRATION OF A FLOWING SUBSTANCE

(75) Inventors: Kent Strid, Fuengirola (ES); Rolf Oswaldson, Gavle (SE)

(73) Assignee: Kvaerner Pulping AB (SE)

( * ) Notice: Subject to any disclaimer, the term of this patent is extended or adjusted under 35 U.S.C. 154(b) by 0 days.

(21) Appl. No.: 09/485,805

(22) PCT Filed: Aug. 20, 1998

(86) PCT No.: PCT/SE98/01497

§ 371 Date: Apr. 10, 2000

§ 102(e) Date: Apr. 10, 2000

(87) PCT Pub. No.: WO99/10074

PCT Pub. Date: Mar. 4, 1999

(30) Foreign Application Priority Data

Aug. 21, 1997 (SE) .................................................. 9703025

(51) Int. Cl.$^7$ .............................. B01D 37/00; B01D 33/15
(52) U.S. Cl. ...................... 210/780; 210/791; 210/808; 210/331; 210/391
(58) Field of Search .................................. 210/330, 331, 210/780, 784, 332, 808, 791, 391

(56) References Cited

U.S. PATENT DOCUMENTS

| 4,695,381 | * | 9/1987 | Ragnegard | ........................... 210/403 |
| 4,929,355 | * | 5/1990 | Ragnegard et al. | ................. 210/331 |

* cited by examiner

Primary Examiner—Robert J. Popovics
(74) Attorney, Agent, or Firm—Fasth Law Offices; Rolf Fasth (57) ABSTRACT

A filter and a method for filtration is based upon moving a filter surface that is caused to move through a first filtration region (FF) for separation of a prefiltrate and through a second filtration region (KF) for separation of a clear filtrate. A vacuum is applied on the filtrate side of the filtration region (KF). The filtrate region (FF) has two filtration zones ($FF_1$ and $FF_2$) with mutually different pressure conditions. The filtration zone $FF_1$ has atmospheric pressure and the filtration zone $FF_2$ has a pressure that is lower than the pressure of $FF_1$. The pressure change between the filtration zones ($FF_1$ and $FF_2$) occurs in the pre-filtrate region, i.e., before the filter surface has reached the filtrate region (KF).

16 Claims, 4 Drawing Sheets

ROTATABLE FILTER SYSTEM FOR FILTRATION OF A FLOWING SUBSTANCE

TECHNICAL FIELD

This invention concerns a rotating a filter for filtration of a flowing substance.

BACKGROUND AND SUMMARY OF THE INVENTION

The term "flowing substance" occurring hereinafter is intended to comprise various liquids, suspensions etc containing constituents which are desirable to filter away. Even if this invention is in no way restricted thereto, a preferred use of the invention is in connection with dewatering of fibre suspensions. Cellulose fibres are primarily intended as fibres although also other applications are possible. In case of fibre suspensions, the invention may for instance be used for filtration of back water in paper machines.

Although the invention with preference is useful in so called disc filters and hereinafter will be more specifically described in connection with such a filter, it is pointed out that the invention can also be used with other types of filters of a rotating nature.

A relatively cloudy filtrate, pre-filtrate, is obtained in the first filtration region. The filter element arrives in this first filtration region liberated from material layers previously deposited thereon. The openings of the filter element are, thus, open in the beginning of the first filtration region, which initially means a substantial passage of fibres so that the pre-filtrate will be "cloudy", i.e. contain relatively high contents of fibre. A fibre layer is successively built up in the first filtration region, a fact that will successively improve the filtering ability, i.e. reduce the fibre contents in the filtrate.

Rotating filters of the kind intended here occur in two versions. In a first of these, a substantially atmospheric pressure is used in the first filtration region, i.e. vacuum is not used to promote pre-filtrate passage through the filter element. Thus, it is only gravity that influences the pre-filtrate to pass through the filter element and the fibre layer deposited thereon. This means that the filtering capacity expressed as volume per time unit becomes comparatively low. In addition, it is pointed out that the fibre layer deposited on the filter element will be rather porous. When the fibre layer during rotation of the rotor arrives in the second filtration region, the clear filtrate region, a vacuum is applied which influences the filtrate through the fibre layer and the filter element and this vacuum will tend to cause a chock which gives rise to a troublesome passage of fibres which will join the clear filtrate.

In the second of the filter versions, a vacuum is used not only in the second filtering region but also in the first to increase the filtering efficiency expressed as the volume of substance per time unit as compared to the case where an atmospheric dewatering pressure is used. This increased efficiency is, however, achieved in connection with an inconveniently high initial passage of fibres, which gives rise to a high amount of fibre in the pre-filtrate. The fibre contents will be inconveniently large also in the clear filtrate as compared to the case where atmospheric dewatering pressure is used in the first filtration region, which is probably due to the fact that application of a vacuum in the first filtration region does not allow build up of a fibre mat on the filter element, said fibre mat operating efficiently thereafter from a filtration point of view.

Even if, as pointed out hereinabove, the clear filtrate has turned out to have, when vacuum is used in the first filtration region, a higher proportion of fibres than is the case when atmospheric pressure is used in the first filtration region, it can be established that also when atmospheric pressure is used, the clear filtrate has an inconveniently high proportion of fibres. The consequence thereof has been that one often has had to couple two filters in series to achieve an acceptably low proportion of fibres in the clear filtrate. In this connection it is pointed out that the pre-filtrate at least in some applications is recirculated to the filter inlet. This means that it is of course also important to reduce the fibre contents in the pre-filtrate.

The object of the present invention is to devise ways to develop prior rotating filters for the purpose of reducing the disadvantages discussed hereinabove. In a corresponding manner, the invention aims at improving the filtration method such that an improved filtration result may be achieved.

By designing the first filtration region such that at least two filtration zones having different pressure relations are established in said first filtration region, a substantially improved filtration result is achieved in the sense that the contents of the material, in particular fibres, which is to be filtered off is reduced at least in the clear filtrate. Besides, the filtering capacity expressed as volume substance to be filtered per time unit is also improved.

The explanation of the improved filtering function is that an atmospheric pressure or possibly a relatively weak vacuum is used in the first filtration zone in the first filtration region so that formation of a comparatively porous material layer on the filter element is allowed. Not until in a subsequent second filtration zone contained in the first filtration region vacuum is applied. Since there is already in this second filtration zone a filtering material layer on the filter element, this material layer will function filtrating comparatively efficiently on application of a vacuum. The increased value of the filtrate passage as a consequence of the vacuum applied causes, accordingly, a considerable capacity increase in the first filtration region compared to the case where vacuum is not applied in this first filtration region. When the vacuum is applied, a compressing will occur of the material layer deposited on the filter element so that the filtration ability is then considerably improved as far as separation is concerned compared to the two different prior filter versions discussed hereinabove.

An important feature of the present invention is, accordingly, that the first pressure change occurring on filtration between a relatively high pressure, for instance atmospheric pressure or a relatively weak vacuum, and a relatively low pressure, namely a vacuum, occurs within the first filtration region, i.e. within the region where the pre-filtrate is separated, such that the increased amount of material to be filtered off and which will be discharged in the filtrate as a consequence of the pressure change will end up in the pre-filtrate and not in the clear filtrate. It is in this connection emphasised that what is here intended is the "first" pressure change occurring within the first filtration region, a fact which does not at all preclude that after this first pressure change one or more further pressure changes are conducted. Thus, a pressure change in this regard is a change of the pressure drop over the filter element in the filtrate passage direction in an increasing sense by decreasing the pressure on the downstream side of the filtering surface.

BRIEF DESCRIPTION OF THE DRAWINGS

With reference to the enclosed drawings, a more specific description of an embodiment example of the invention will follow hereafter.

In the drawings.

DETAILED DESCRIPTION OF A PREFERRED EMBODIMENT

The filter and the filtration method according to the invention will hereinafter be described as used for backwater cleaning of a paper machine.

When the term "vacuum" is used hereinafter, the intention is to express a lower pressure than the reference or ambient pressure. Thus, the word "vacuum" does not involve any statement with respect to the magnitude of the lower pressure.

Figure 1:
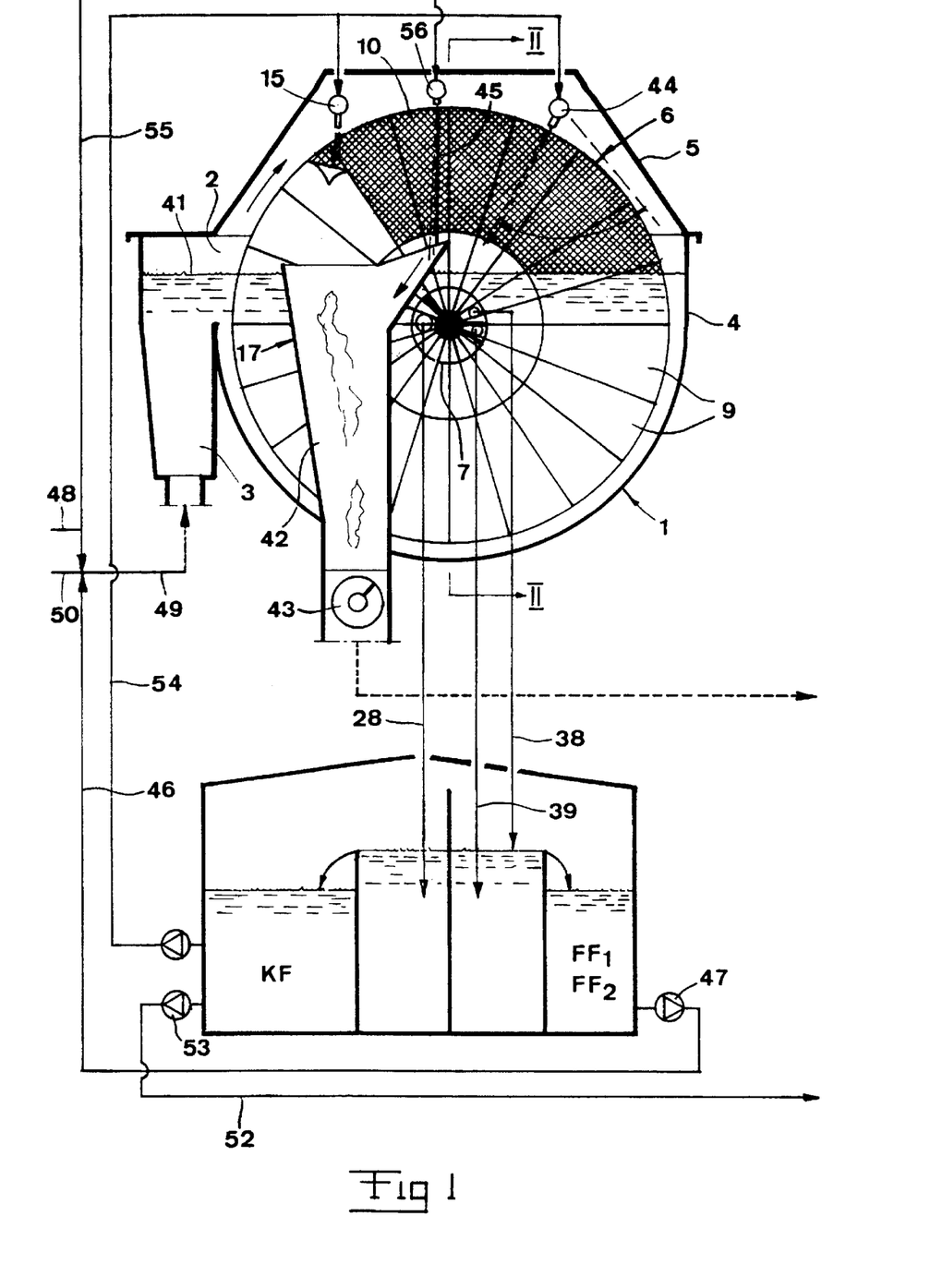
FIG. 1 is a diagrammatical view illustrating the filter according to the invention as used for backwater cleaning in a paper machine.

The filter comprises a container generally denoted 1 in FIG. 1, said container having an inlet 2 for the fibre suspension. A conduit leading to the inlet 2 is denoted 3. The container 1 itself has a lower part 4 having the character of a trough, the upper part of which is closed by means of one or more openable covers or the like 5.

A rotor generally denoted 6 is rotatably arranged in the container 1. This rotor comprises an inner rotor part 7 and a number of outer disc like filter elements 8 orientated transversely to the geometric axis of the inner rotor part 7. This axis coincides with the axis of rotation of the rotor. Although it is preferred in practice that the disc like filter elements 8 are orientated substantially perpendicularly to the axis of rotation of the rotor and the geometrical axis of the inner rotor part 7, it should be stressed that the expression "transversely" used also includes a certain deviation from such a perpendicular position. The individual disc like filter element 8 extends in an annular configuration about the inner rotor part 7. This ring configuration is, more specifically, divided (see FIGS. 1 and 3) in a number of filter sectors 9. Each of these filter sectors 9 comprises a filtering surface, which has been indicated in FIGS. 1 and 3 by the square pattern at the top, and inner passages (not illustrated) for conveying filtrate passing through the filtering surface 10 to a number of filtrate channels 11 in the inner rotor part 7.

Figure 3:
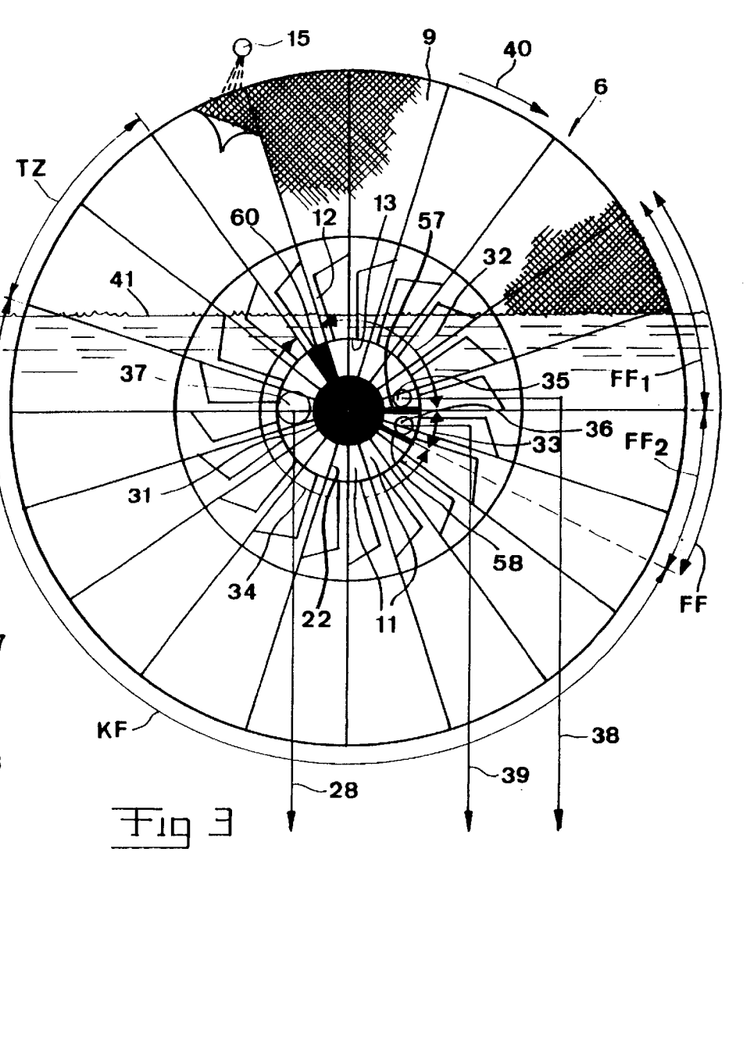
FIG. 3 is an enlarged view of a detail in FIG. 1 in a diagrammatical state.

As is most clearly apparent from FIG. 3, each individual filter sector 9 comprises a conduit-like channel section 12 for transferring the filtrate, i.e. the filtered water, from the filter sector 9 in question inwardly to a respective filtrate channel 11 in the rotor part 7 via an opening 13 for the filter sector in question in a mantle 14 of the rotor part 7.

The device comprises means 15 for releasing fibre material, which has been filtered off and deposited on the filtrating surface 10. This releasing means 15 is here formed by spray nozzles placed to separate, by suitable spraying of water or other liquid, the cake of material filtered off from the filter sectors as these filter sectors rotate past the releasing means. As will be described more specifically hereafter, the filter comprises means 17 for discharging the released fibre material.

It appears from FIG. 3 that the conduit like channel sections 12 form a spoke configuration between the filter sector 9 and the inner rotor part 7, i.e. that open spaces occur between these individual spokes. These open spaces simplify for the fibre suspension supplied to the container to uniformly distribute itself along the length of the container. The fibre suspension may of course also distribute itself within the container 1 through the slots occurring radially inwardly of the peripheries of the filter element 8 and on the inside of the container 1.

Figure 2:
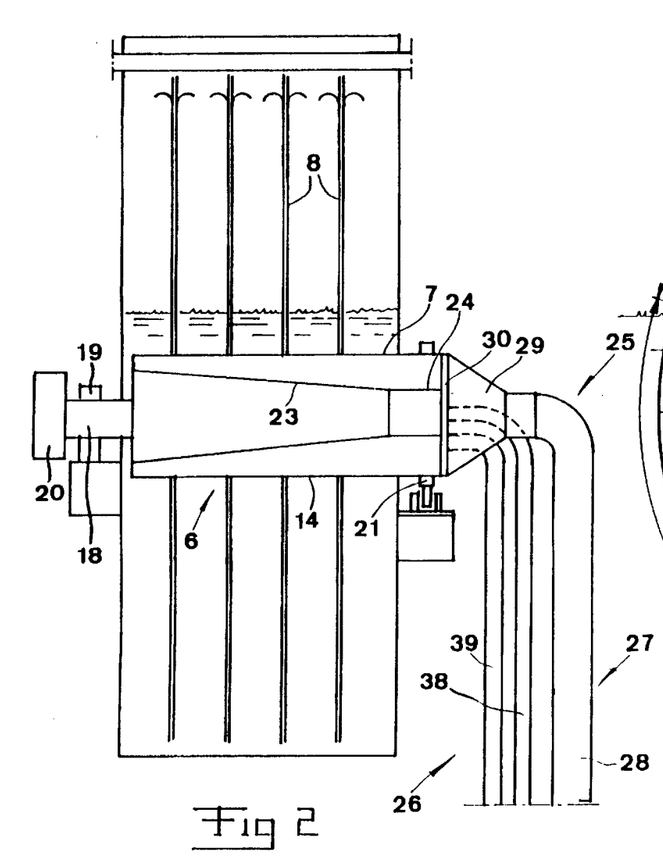
FIG. 2 is a cross section taken along the line II—II in FIG. 1.

The inner rotor part 7 has in practice the character of a centre shaft, which is journalled to rotate in a suitable manner. It is indicated in FIG. 2 that the centre shaft 7 at one of its ends may comprise a shaft pin 18 mounted in a suitable bearing 19 and coupled to a drive motor 20. At the other end the centre shaft 7 is held in bearings 21 supporting against the exterior side of the mantle 17 of the centre shaft 7.

The filtrate channels 11 within the centre shaft 7 have the character of sector shaped spaces mutually separated by means of substantially radially orientated partition walls 22, extending along the entire length of the centre shaft 7. As appears from FIG. 2, the centre shaft 7 comprises a tubular core 23, to the mantle of which the partition walls 22 adjoin tightly such that the tubular core 23 forms radially innermost delimitations of the filtrate channels 11. As appears from FIG. 2, the tubular core 23 may have a varying diameter along the length of the centre shaft 7. More specifically, the device is such that the tubular core 23 has its smallest diameter at 24, which is the end of the tubular core 23 which is located at that end of the centre shaft 7 where the filtrate passes out of the centre shaft in its axial direction.

The filter comprises a device generally denoted 25 (FIG. 2) for discharging filtrate having passed through the filtering surface of the filter element. This device comprises a first arrangement 26 for discharging of relatively cloudy filtrate, hereafter denominated pre-filtrate (FF), and a second arrangement 27 for discharging a second relatively clear filtrate, hereafter denominated clear filtrate (KF).

The first and second arrangements 26, 27 are disposed such that the filter element 8 during rotation of the rotor 6 first passes a first filtration region FF (see the arc designated in a corresponding way in FIG. 3) formed by the first arrangement 26 and then reaches a second filtration region KF (please see the corresponding arc in FIG. 3) formed by the second arrangement 27. The second arrangement 27 comprises means 28 for applying a vacuum in the second filtration region KF to promote the clear filtrate discharge. This means 28 may comprise a barometric leg intended to establish a vacuum in a suction head denoted 29, said suction head communicating with the filtrate channels 11 in the centre shaft 7 via a filtrate valve 30. The suction head 29 and the filtrate valve 30 are stationarily arranged, i.e. they do not accompany the rotation of the rotor. The filtrate valve 30 comprises a likewise stationary disc 31, comprising closed portions, which in FIGS. 1 and 3 are black and besides open portions which are sector shaped and indicated at 32, 33 and 34 by the arc shaped double arrows denoted with these figures. In FIG. 3 37 designates an opening, which in the open area 34 of the disc 31 communicates with the filtrate channels 11 present for the time being in this area, said opening 37 being in communication with the barometric leg 28 to apply a vacuum on the filtrate channels 11 in the area 34.

The first arrangement 26 comprises first and second means 38 and 39 respectively to establish, in the first filtration region FF (FIG. 3), at least two filtration zones $FF_1$ and $FF_2$ having different pressure conditions, namely a first filtration zone $FF_1$ with atmospheric pressure or a relatively weak vacuum and a second filtration zone $FF_2$ having a vacuum, which involves a pressure which is lower than the pressure in the first filtration zone $FF_1$. The second filtration zone $FF_2$ is located, as viewed in the direction of rotation of the rotor, after the first filtration zone $FF_1$ but before the second filtration region KF.

As mentioned above, a weak vacuum may be present in the filtration zone $FF_1$. In such a case it is preferred that this vacuum is provided by designing the means 38 to have the character of a barometric leg intended to provide this relatively weak vacuum. However, the invention is mostly intended to be used with an atmospheric pressure in the filtration zone $FF_1$, i.e. that there is substantially no pressure drop over the filtering surface of the filter element but the filtrate passage through the filtering surface is only caused by gravity on the substance to be filtered. In this case the means 38 may simply have the character of a discharge tube. It communicates via an opening (FIG. 3) indicated at 35 with the open area 32 in the disc 31.

A vacuum is applied in the second filtration zone $FF_2$ by the means 39, said vacuum involving a pressure which is lower than the pressure downstream of the filtrating surface in the first filtration zone $FF_1$. Expressed in other words, a vacuum present downstream of the filtrating surface will, accordingly, promote pre-filtrate passage through the filtrating surface in the second filtration zone $FF_2$. Also the means 39 may have the character of a barometric leg adapted to apply said vacuum. An opening communicating with the open area 33 of the disc 31 is denoted 36 in FIG. 3, said opening 36 in its turn communicating with the barometric leg 39.

It is emphasized that the invention also comprises other designs to achieve a vacuum than barometric legs.

The second filtration zone $FF_2$ is, as appears from FIG. 3, located, viewed in the direction of rotation (arrow 40) of the rotor, after the first filtration zone $FF_1$ but before the second filtration region KF.

When the centre shaft 7 rotates relative to the suction head 29 and the filtrate valve 30, the filter sectors 9, the channel sections 12 of which for the moment are located opposite to the opening sector 32 of the disc 31, will be in communication with the pre-filtrated outlet 38. The filter sectors 9, the channel sections 12 of which for the moment are located opposite to the opening sector 33 in the disc 31, will be in communication with the outlet tube 39 for pre-filtrate. The filter sectors 9, the channel sections 12 of which for the moment are located opposite to the opening sector 34 in the disc 31 are, finally, in connection with the clear filtrate outlet 28.

The liquid level in the container is denoted 41. As appears from FIG. 3 there is a drying zone TZ after, as viewed in the direction of rotation, the filtration region KF, in which drying zone the filter sectors 9 have reached above the liquid level 41 and in which the vacuum still applied in the opening sector 34 of the disc 31 still gives rise to a drying air flow through the fibre cake deposited on the filtrating surface of the filter sector, said fibre cake being removed from the filter sectors by the means 15 not until after termination of the drying zone TZ.

In the example, the means 17 for discharging the released fibre material are formed by chutelike fibre collecting members 42, which between two adjacent discs and sidewardly of the two outermost discs in the filter are located to intercept fibre material released from the filter discs by the releasing means 15. These collection means 42 may be combined with fibre discharge members 43, for instance in the form of a transport screw device extending in the longitudinal direction of the axis of rotation of the rotor. The filter comprises further means 44 for cleaning the filter sectors after them having been deliberated from deposited fibre material by the releasing means 15. The means 44 may have the character of spraying nozzles, for instance provided on an oscillating carrier to efficiently sweep over the filter sectors. A partition wall 45 extending axially relative to the rotor separates the upper area of the interior of the container, where the deposited fibre material is released from the filter sectors, from the area where spraying for cleaning occurs by the means 44.

As far as the filter has been described until now it operates in the following manner. When the rotor 6 rotates, the filter sectors 9 will, after having been cleaned by the means 44, move down into the suspension in the container 1. The filter sectors will then enter into the first filtration zone $FF_1$, where water will flow through the filtrating surface 9 on the filter sectors, during which fibres are caught on the surface. The water flows within the filter sectors via the passages 12 and the openings 13 into the filtrate channels 11 and further within the sector 32 of the disc 31 out through the pre-filtrate outlet 38 diagrammatically indicated in FIG. 3. When the filter sectors then move further, they will gradually enter with their filtrate channels 11 in the centre shaft 7 into the sector area 33 of the disc 31, which means that the filter sectors then are put under suction from the vacuum barometric leg 39, which likewise is diagrammatically indicated in FIG. 3. This means efficient suction of filtrate through the filtrating surfaces of the filter sectors and deposition thereon of fibre material, which will be subjected to a compression. In this second filtration zone $FF_2$ a pre-filtrate is discharged, as is the case in the zone $FF_1$.

On continued rotation of the rotor, the filter sectors will then enter into the opening sector 34 of the disc 31, i.e. into the second filtration region KF, where a clear filtrate is separated. The filtrate channels 11 are then put under vacuum via the vacuum barometric leg 28 and a clear filtrate is discharged therein.

When the filter sectors enter into the drying zone TZ the clear filtrate discharge ceases and instead air will be sucked through the fibre cakes adhering to the filter sectors so that the fibre cakes are dried. The filter sectors then move past the releasing means 15 and the fibre material released arrives in the collecting means 42 to be transported away.

It is illustrated in FIG. 1 that the pre-filtrates arriving through the outlets 38 and 39 are suitably brought together. The first arrangement 26 may then be adapted to recirculate the pre-filtrate emanating from the two filtration zones $FF_1$ and $FF_2$ to the filter via a conduit indicated at 46, possibly with assistance of a pump 47. In the example it is conceived to be the question of backwater cleaning in a paper machine. The backwater is supplied via a conduit 48 and is combined with the recirculated pre-filtrate before the combination via a conduit 49 is supplied to the interior of the container 1. In backwater cleaning it is promoting for the cleaning if the backwater, which as a rule contains comparatively short fibres, is provided with a certain amount of additive pulp, which suitably should have long fibres. A conduit for supply of such additive pulp is indicated in FIG. 1 at 50. As appears from the figure, the materials arriving via the conduits 46, 48 and 50 are supplied to the container of the filter.

It is diagrammatically indicated at 51 how the filtrated fibre mass is discharged. The clear filtrate is discharged via the conduit 52, possibly with the assistance of a pump 53. It is preferable to use the clear filtrate for supply of spray water to the releasing and cleaning means 15, 44 respectively and a conduit provided for this purpose is denoted 54.

If desired, dilution of the exiting pulp may occur by means of uncleaned backwater via a conduit 55 and nozzles 56.

It is preferred that the vacuum in the second filtration zone $FF_2$ and the second filtration zone KF is substantially equal.

As appears most clearly from FIG. 3, the disc 31 has portions separating different zones from each other. These portions are denoted 57, 58 and 60 respectively. The portion 57 forms a delimitation between the filtration zones $FF_1$ and $FF_2$ whereas the portion 58 forms a delimitation between the second filtration zone $FF_2$ and the filtration region KF. For a complete delimitation without possibilities to leakage, the portions 57, 58 would have to be so large that they cover at least one of the filtrate channels 11, i.e. that an individual filtrate channel 11 cannot form any leakage possibility in the border areas. However, it is indicated in FIG. 3 that the portions 57 and 58 are narrower than motivated by the cross section of a filtrate channel 11. Thus, this means that in the embodiment according to FIG. 3 there occurs no complete delimitation. Instead, the portions 57 and 58 have the character of relatively thin walls. However, it is assumed that these are sufficient since a certain leakage between the filtration zones $FF_1$ and $FF_2$ from the former towards the latter as a consequence of the vacuum is not considered to be more serious than can be accepted. Besides, the pre-filtrate from both filtration zones $FF_1$ and $FF_2$ are brought together such that filtrate leakage past this limit is not serious. Between the second filtration zone $FF_2$ and the filtration region KF a certain leakage of pre-filtrate from the second filtration zone $FF_2$ can be accepted since the pre-filtrate resulting in $FF_2$ closest to KF is comparatively clean. From what is stated it appears, accordingly, that the portions 57, 58 may be designed to be so wide that they cause a complete limitation between the respective zones/regions but that one may possibly renounce such a complete limitation. Such renunciation gives the advantageous effect that the total filtration capacity increases since large portions 57, 58 mean that the effective filtration will get a reduced duration.

As far as the limitation portion 60 between the second filtration region KF and the opening sector 62 in the disc 31 is concerned, it is established that the portion in question should be designed such that a complete limitation is achieved, i.e. the portion 60 should comprise at least an area equally large as the area of a filtrate channel 11. As appears from FIG. 3, the portion 60 is located so that the vacuum application ceases before the fibre cakes deposited on the filter sectors are released by the means 15.

Figure 4:
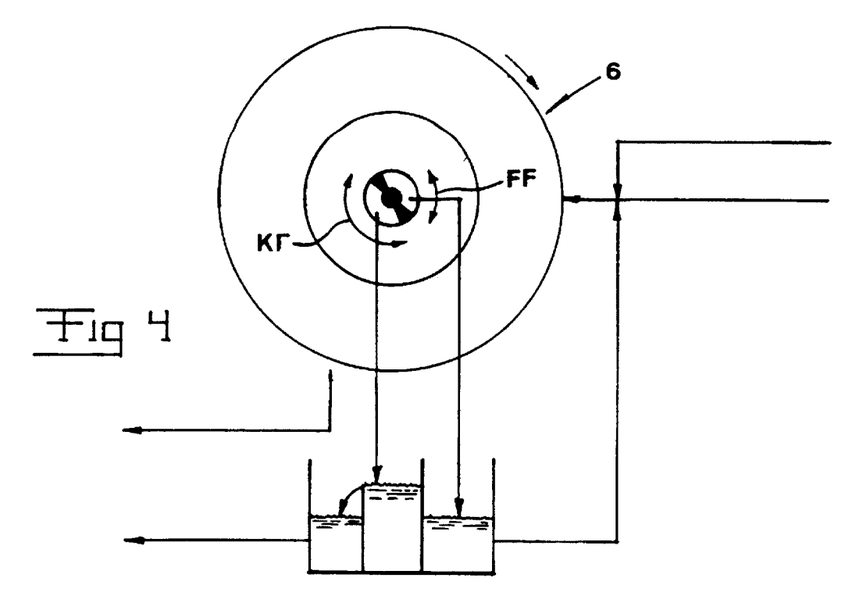
FIGS. 4 and 5 are views comparing a known embodiment (FIG. 4) with the embodiment (FIG. 5) according to the invention.
Figure 5:
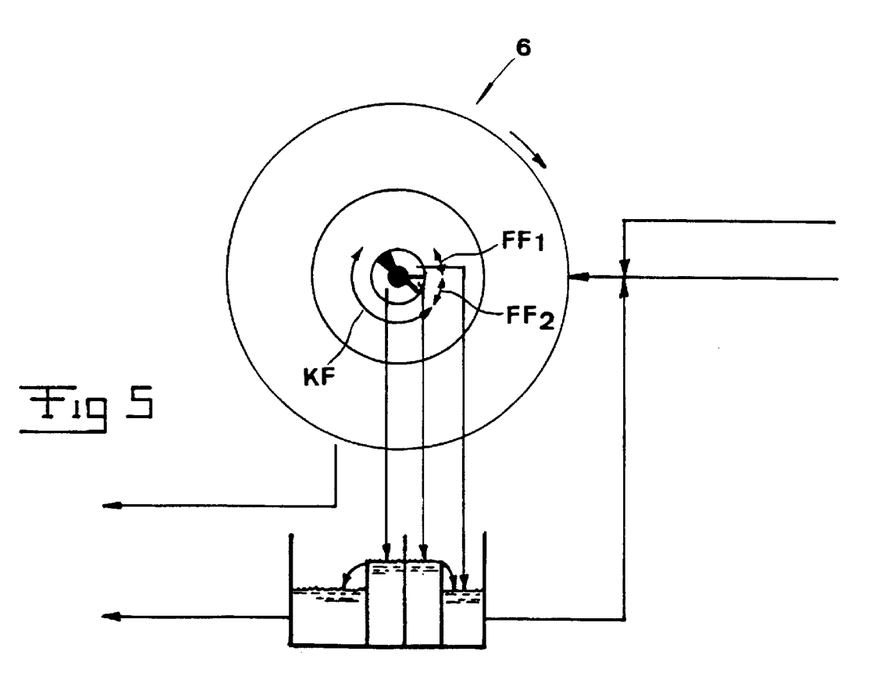

FIGS. 4 and 5 illustrate as a comparison the prior art (FIG. 4) and the invention (FIG. 5). In the prior art according to FIG. 4 there is in the first filtration region FF either an atmospheric pressure so that there is not in reality any pressure difference over the filter element or a vacuum is applied in order to also promote filtrate discharge in the first filtration region. A full vacuum is applied in the second filtration region KF to promote clear filtrate discharge. The invention is illustrated as a comparison in FIG. 5 and it appears then that the first filtration region is divided into two filtration zones $FF_1$ and $FF_2$ as previously described, both of which yield pre-filtrate. The second filtration region KF delivers a clear filtrate as according to the prior art.

Figures 6, 7, 8:
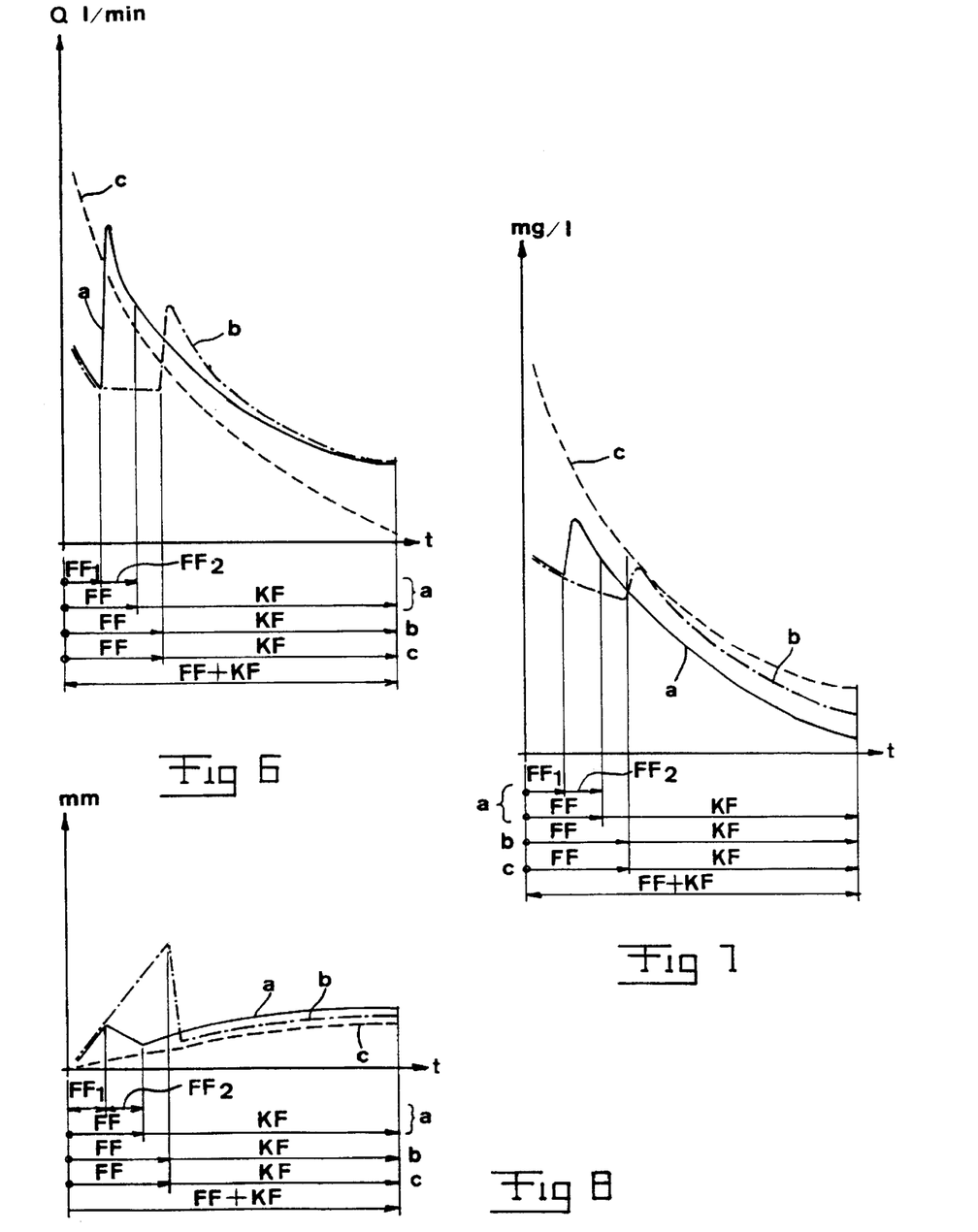
FIG. 6 is a diagram comparing the capacity expressed as volume per time unit during the filtration procedure, the invention being compared to two known filtration methods.
FIG. 7 is a diagram similar to the one in FIG. 6 but illustrating the fibre contents in the separated filtrate during the course of filtration.
FIG. 8 is a diagram illustrating build up of a fibre layer on the filtering surface of the filter element during the course of filtration with the invention and two known filtration methods.

In FIG. 6 the X-axis illustrates time whereas the Y-axis illustrates the filtrate discharge as volume per time unit. The curve in full lines and denoted a represents the invention. The curve denoted b represents known filtration with atmospheric pressure on the filtrate side in the entire pre-filtrate region FF whereas a vacuum is applied in the clear filtrate region KF. Finally, the curve c illustrates prior art with vacuum on the filtrate side in the pre-filtrate region as well as the clear filtrate region. It appears that in the invention (curve a) the fibre cake being under build up in the filtration zone $FF_1$ in absence of vacuum gives rise to a declining through-flow. When vacuum is applied in the filtration zone $FF_2$, a rapid increase of the through-flow occurs and this is kept comparatively high during the entire remainder of the filtration, i.e. also in the clear filtrate region KF. The curve b with absence of vacuum in the pre-filtrate region FF involves that the vacuum applied not until in the clear filtrate region KF increases the through-flow of filtrate relatively late, which causes a restriction of the total through-flow in comparison with the invention (a). The curve c provides per se a good through-flow of filtrate already from the beginning by vacuum application in the entire pre-filtrate region FF but this through-flow becomes substantially less at the end of the filtration course than in the invention.

FIG. 7 illustrates with corresponding illustration means a diagram where the relation time (X-axis) and fibre contents (Y-axis) in the filtrate may be extracted. It appears that the invention (curve a) involves a very good improvement as compared to the prior art (curves b and c) and this more specifically as a consequence of the fact that with the invention fibre cakes are allowed to build-up on the filter sectors in pre-filtrate zone $FF_1$ without vacuum and then vacuum is applied, still in the pre-filtrate region, so that accordingly vacuum has already been built up when the filter sectors reach into the clear filtrate region KF.

FIG. 8 illustrates the fibre cake build-up for the three cases according to the previous figures in a diagram where the X-axis denotes time and the Y-axis cake thickness. It appears that the art according to the invention yields a fibre cake thickness on the filter sectors in the clear filtrate region KF that in average is larger.

It is evident that the invention described is not only limited to what has been said above. Thus, it should be understood that men skilled in the art are capable of realising advantageous detail designs and changes when the basic concept of the invention has already been presented. It is in this regard particularly pointed out that more pressure change steps than those described above of course may be carried out during the filtration cycle. Furthermore, it is pointed out that the invention is not only necessarily useful in connection with so called disc filters. As an example, it would be well possible to execute the invention with so called drum filters, measures having to be taken within the respective filter drums to form the respective filtration regions/zones. Also other modifications are possible within the scope of the concept of the invention.

While the present invention has been described in accordance with preferred compositions and embodiments, it is to be understood that certain substitutions and alterations may be made thereto without departing from the spirit and scope of the following claims.

What is claimed is:

1. A rotating filter system for filtration of a flowing substance, comprising:

a container containing a liquid so that the liquid fills the container up to a liquid level;

a rotor having a filter element attached thereto, the rotor being rotatable in a rotational direction;

a filtrate discharge device in operative engagement with the rotor for discharging filtrate having passed through the filter element, the filtrate discharge device comprising a disc having first, second and third openings defined therein, the first and second openings being in fluid communication with a prefiltrate arrangement for discharging a cloudy filtrate and the third opening being in fluid communication with a clear filtrate arrangement for discharging a clear filtrate, the disc, the prefiltrate arrangement and the clear filtrate arrangement being disposed below the liquid level;

the prefiltrate arrangement and the clear filtrate arrangement being disposed so that the filter element, during rotation of the rotor, passes a first filtration region (FF), formed by the prefiltrate arrangement, and then reaches a second filtration region (KF) formed by the clear filtrate arrangement, the second filtration region (KF) being disposed downstream of the first filtration region (FF), the clear filtrate arrangement comprising vacuum means for applying a vacuum in the second filtration region (KF) to promote a clear filtrate discharge; and the prefiltrate arrangement having a first means for establishing, in the first filtration region (FF), a first filtration zone (FF1) and a second means for establishing a second filtration zone (FF2), the first filtration zone (FF1) having a first pressure and the second filtration zone (FF2) having a second pressure that is lower than the first pressure, the second filtration zone (FF2) being disposed downstream of the first filtration zone (FF1) in the rotational direction of the rotor, the second filtration zone (FF2) being disposed upstream from the second filtration region (KF).

2. The rotating filter according to claim 1, wherein the pre-filtrate arrangement is adapted to recirculate a prefiltrate received from the first filtration zone (FF1).

3. The rotating filter according to claim 1, wherein the pre-filtrate arrangement is adapted to recirculate a prefiltrate received from the second filtration zone (FF2).

4. The rotating filter according to claim 1 wherein the second pressure of the second filtration zone (FF2) is substantially equal to a pressure in the second filtration region (KF).

5. The rotating filter according to claim 1 wherein the filter element has a filtering surface, the filter element has internal passages defined therein for conveying filtrate passing through the filtering surface to filtrate channels defined in an inner rotor part, the filtrate channels are in fluid communication with the filtrate discharge device and adapted to be, during rotation of the rotor, successively brought into connection with the prefiltrate arrangement to form the first filtration region (FF) and with the clear filtrate arrangement to form the second filtration region (KF).

6. The rotating filter according to claim 5 wherein the filtrate discharge device has a filtrate valve to establish connection between the filtrate channels in the inner rotor part and the vacuum means.

7. The rotating filter according to claim 6 wherein the filtrate valve has a non-rotating disc that comprises portions that are adapted to separate the first filtration zone (FF1) from the second filtration zone (FF2) and the second filtration zone (FF2) from the second filtration region (KF).

8. A method for filtration of a flowing substance, comprising:

providing a container having a liquid with a liquid level and a rotor having a filter element with a filtering surface, the rotor being rotatable in a rotational direction, a filtrate discharge device comprising a disc comprising a first sector having a first opening defined therein, a second sector having a second opening defined therein and a third sector having a third opening defined therein, the rotor and the filtrate discharge device being submerged in the liquid below the liquid level;

passing a filtrate through the filtering surface to form a filtrate cake on the filtering surface;

rotating the rotor to submerge a first portion of the filtering surface below the liquid level and to align the submerged first portion of the filtrate cake with the first sector and filtrating the first portion of the filtrate cake;

withdrawing a first cloudy pre-filtrate through the first opening at a first pressure;

rotating the rotor to aligning the submerged first portion of the filtrate cake with the second sector and filtrating the first portion of the filtrate cake;

withdrawing a second cloudy pre-filtrate through the second opening at a second pressure, the second pressure being lower than the first pressure;

rotating the rotor to aligning the submerged first portion of the filtrate cake with the third sector and filtrating the first portion of the filtrate cake; and applying a vacuum in the third section and withdrawing a clear filtrate through the third opening.

9. The method according to claim 8 wherein the method further comprises recirculating the cloudy pre-filtrate through the first filtration zone (FF1).

10. The method according to claim 9 wherein the method further comprises recirculating the cloudy pre-filtrate through the second filtration zone (FF1).

11. The method according to claim 8 wherein the method further comprises providing the second filtration region (KF) with a pressure that is substantially equal to the second pressure of the second filtration zone (FF2).

12. The method according to claim 8 wherein the method further comprises flowing the filtrate through filtrate channels to an inner part of the rotor and rotating the rotor to bring the filtrate channels into communication with a filtrate discharge device for forming the first filtration region (FF) and the second filtration region (KF).

13. The method according to claim 12 wherein the method further comprises connecting the filtrate channels with the inner part of the rotor, establishing a vacuum in the first filtration region (FF) and the second filtration region (KF) with a filtration valve and separating the first filtration zone (FF1) from the second filtration zone (FF2) with the filtration valve.

14. A method for filtration of a flowing substance, comprising:

providing a container having a liquid with a liquid level and a rotor having a filter element with a filtering surface, the rotor being rotatable in a rotational direction, a filtrate discharge device comprising a stationary disc comprising a first sector having a first opening defined therein in fluid communication with a first discharge conduit, a second sector having a second opening defined therein in fluid communication with a second discharge conduit and a third sector having a third opening defined therein in fluid communication with a third discharge conduit, the rotor and the filtrate discharge device being submerged in the liquid below the liquid level;

passing a filtrate through the filtering surface to form a filtrate cake on the filtering surface;

rotating the rotor to submerge a first portion of the filtering surface below the liquid level and to align the submerged first portion of the filtrate cake with the first sector and filtrating the first portion of the filtrate cake;

withdrawing a first cloudy pre-filtrate through the first opening at a first pressure and discharging the first cloudy pre-filtrate through the first discharge conduit;

rotating the rotor to align the submerged first portion of the filtrate cake with the second sector and filtrating the first portion of the filtrate cake;

withdrawing a second cloudy pre-filtrate through the second opening at a second pressure and discharging the second cloudy pre-filtrate through the second discharge conduit, the second pressure being lower than the first pressure;

rotating the rotor to aligning the submerged first portion of the filtrate cake with the third sector and filtrating the first portion of the filtrate cake;

applying a vacuum in the third section and withdrawing a clear filtrate through the third opening; and recycling the first and second cloudy pre-filtrates back to the container.

15. The method according to claim 14 wherein the method further comprises dewatering a cellulose fiber suspension.

16. The method according to claim 14 wherein the method further comprises cleaning a back water in a paper machine.

* * * * *

UNITED STATES PATENT AND TRADEMARK OFFICE
CERTIFICATE OF CORRECTION

PATENT NO.    : 6,258,282 B1                                       Page 1 of 1
DATED         : July 10, 2001
INVENTOR(S)   : Kent Strid and Rolf Oswaldson It is certified that error appears in the above-identified patent and that said Letters Patent is hereby corrected as shown below:

<u>Title page,</u>
Item [73], Assignee, delete "Kvaerner Pulping AB (SE)" and replace with
-- Kvaerner Pulping AS (SE) --.

Signed and Sealed this

Twenty-sixth Day of August, 2003

JAMES E. ROGAN
*Director of the United States Patent and Trademark Office*